(12) United States Patent
Sun et al.

(10) Patent No.: US 11,962,230 B2
(45) Date of Patent: Apr. 16, 2024

(54) METHOD AND DEVICE FOR CONTROLLING DCDC CONVERTER

(71) Applicant: GREAT WALL MOTOR COMPANY LIMITED, Hebei (CN)

(72) Inventors: Zhaolue Sun, Hebei (CN); Zepeng Li, Hebei (CN); Chao Qian, Hebei (CN); Haijun Song, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 115 days.

(21) Appl. No.: 17/789,863

(22) PCT Filed: Jan. 8, 2021

(86) PCT No.: PCT/CN2021/070961
§ 371 (c)(1),
(2) Date: Jun. 29, 2022

(87) PCT Pub. No.: WO2021/175011
PCT Pub. Date: Sep. 10, 2021

(65) Prior Publication Data
US 2023/0035893 A1    Feb. 2, 2023

(30) Foreign Application Priority Data
Mar. 2, 2020    (CN) .......................... 202010137252.4

(51) Int. Cl.
*H02M 1/00* (2006.01)
*B60L 15/20* (2006.01)
*H02J 7/00* (2006.01)

(52) U.S. Cl.
CPC ........... *H02M 1/0006* (2021.05); *B60L 15/20* (2013.01); *H02J 7/0048* (2020.01); *B60L 2210/10* (2013.01); *H02J 2207/20* (2020.01)

(58) Field of Classification Search
CPC .. H02M 1/0006; H02J 7/0048; H02J 2207/20; B60L 15/20; B60L 2210/10
See application file for complete search history.

(56) References Cited

U.S. PATENT DOCUMENTS

| | | | |
|---|---|---|---|
| 2018/0264952 A1* | 9/2018 | Takayama | B60K 6/445 |
| 2021/0162980 A1* | 6/2021 | Echigo | B60K 6/46 |
| 2022/0146584 A1* | 5/2022 | Oono | G01R 31/3835 |

FOREIGN PATENT DOCUMENTS

| | | |
|---|---|---|
| CN | 101207331 A | 6/2008 |
| CN | 102969707 A | 3/2013 |

(Continued)

OTHER PUBLICATIONS

First Office Action dated Dec. 3, 2020 corresponding to Chinese application No. 202010137252.4.
(Continued)

*Primary Examiner* — Jared Fureman
*Assistant Examiner* — Duc M Pham
(74) *Attorney, Agent, or Firm* — Nath, Goldberg & Meyer; Joshua B. Goldberg

(57) ABSTRACT

A method and device for controlling a DCDC converter, used for a hybrid electric vehicle and relating to the technical field of vehicle control. The method comprises: according to an output end current limit value and an actual voltage value, acquiring a first preset value corresponding to an input end power; according to the maximum discharge power of a high-voltage battery and the actual discharge power of an electric motor, acquiring a second preset value corresponding to the input end power; and determining the minimum value in the first preset value and the second preset value as an input end target power limit value. Multiple combination working conditions of sufficient or insufficient power sources at the input end are considered.

19 Claims, 6 Drawing Sheets

--- acquiring a first preset value corresponding to an input-terminal power according to an current limit value and an actual voltage value of an output-terminal — 101

↓ acquiring a second preset value corresponding to the input-terminal power according to a maximum discharging power of a high-voltage battery and an actual discharging power of an electric motor — 102

↓ determining a minimum value of the first preset value and the second preset value to be an input-terminal target-power limit value — 103

(56) References Cited

FOREIGN PATENT DOCUMENTS

| | | | |
|---|---|---|---|
| CN | 103972959 | A | 8/2014 |
| CN | 105207480 | A | 12/2015 |
| CN | 105764741 | A | 7/2016 |
| CN | 106575882 | A | 4/2017 |
| CN | 106953535 | A | 7/2017 |
| CN | 110126672 | A | 8/2019 |
| CN | 111262428 | A | 6/2020 |
| JP | 2005304122 | A | 10/2005 |
| JP | 2010136475 | A | 6/2010 |
| KR | 1020170047838 | A | 5/2017 |

OTHER PUBLICATIONS

International Search Report dated Apr. 8, 2021 corresponding to application No. PCT/CN2021/070961.

* cited by examiner

METHOD AND DEVICE FOR CONTROLLING DCDC CONVERTER

This is a National Phase Application filed under 35 U.S.C. 371 as a national stage of PCT/CN2021/070961, filed Jan. 8, 2021, an application claiming the benefit of Chinese patent application filed on Mar. 2, 2020 before the CNIPA, China National Intellectual Property Administration with the application number of 202010137252.4 and the title of "METHOD AND DEVICE FOR CONTROLLING DCDC CONVERTER", the content of each of which is hereby incorporated by reference in its entirety.

TECHNICAL FIELD

The present disclosure relates to the technical field of vehicle controlling, and more particularly, to a method and apparatus for controlling a DCDC converter.

BACKGROUND

With the development in the technical field of vehicle controlling, the Direct Current Direct Current (DCDC) converter is an important component for maintaining the normal operation of the low-voltage loop for a hybrid-power vehicle, and its function is to convert the high voltage inputted by the power source such as a high-voltage battery and a generator into a low voltage required by a low-voltage load such as a storage battery.

The conversion efficiency of the DCDC converter is an important parameter of the DCDC converter. Currently, in order to ensure the conversion efficiency of the DCDC converter, the voltage at its output terminal should be non-constant, which means that it is required that the power of the input terminal should be dynamically followed. A single input power constraint cannot satisfy the electricity-consumption requirements in various working conditions. A too low power constraint affects the normal usage of the low-voltage components and the stability of the vehicle controller. If the power constraint is too high, the DCDC converter does not reach the maximum usage efficiency, which results in the waste of the energy of the hybrid-power vehicle.

However, by merely calculating from the output terminal of the DCDC converter, the restriction strategy is not abundant. Only the protection of the stability of the low-voltage controller and the safety of the low-voltage storage battery are taken into consideration, and the allocation of the power source at the input terminal is not comprehensively considered, which cannot satisfy multiple combined working conditions in which the power source of the input terminal is sufficient or insufficient, and results in that the DCDC converters have few uses and the accuracy is low.

SUMMARY

In view of the above, the present disclosure provides a method and apparatus for controlling a DCDC converter, to solve the problems of DCDC converters of few uses and the accuracy is low.

In order to achieve the above object, the technical solutions of the present disclosure are realized as follows:

In the first aspect, an embodiment of the present disclosure provides a method for controlling a DCDC converter, wherein the method is applied to a hybrid-power vehicle, and the method includes:

acquiring a first preset value corresponding to an input-terminal power according to a current limit value and an actual voltage value of an output-terminal;

acquiring a second preset value corresponding to the input-terminal power according to a maximum discharging power of a high-voltage battery and an actual discharging power of an electric motor; and determining a minimum value of the first preset value and the second preset value to be an input-terminal target-power limit value.

Optionally, acquiring the first preset value corresponding to the input-terminal power according to the current limit value and the actual voltage value of the output-terminal includes:

acquiring the current limit value and the actual voltage value of the output terminal;

acquiring a conversion efficiency of the DCDC converter; and determining the first preset value corresponding to the input-terminal power according to the current limit value and the actual voltage value of the output terminal and the conversion efficiency of the DCDC converter.

Optionally, the step of acquiring the current limit value of the output terminal includes:

acquiring a current protection value of a low-voltage loop and a storage-battery current limit value; and according to the current protection value and the storage-battery current limit value, determining the current limit value of the output terminal.

Optionally, acquiring the second preset value corresponding to the input-terminal power according to the maximum discharging power of the high-voltage battery and the actual discharging power of the electric motor includes:

when the electric motor is in a driving state, determining the maximum discharging power of a high-voltage battery to be the second preset value corresponding to the input-terminal power.

Optionally, determining the second preset value corresponding to the input-terminal power according to the maximum discharging power of the high-voltage battery and the actual discharging power of the electric motor includes:

when the electric motor is in a generation state, determining a sum of an absolute value of the maximum discharging power of the high-voltage battery and an absolute value of the actual discharging power of the electric motor to be the second preset value corresponding to the input-terminal power.

Optionally, determining the second preset value corresponding to the input-terminal power according to the maximum discharging power of the high-voltage battery and the actual discharging power of the electric motor includes:

when the electric motor is in a generation state and a high-voltage battery is in a charging state, determining an absolute value of the actual discharging power of an electric motor to be the second preset value corresponding to the input-terminal power.

In the second aspect, an embodiment of the present disclosure provides an apparatus for controlling a DCDC converter, wherein the apparatus is applied to a hybrid-power vehicle, and the apparatus includes:

a first acquisition module configured for, acquiring a first preset value corresponding to an input-terminal power according to an current limit value and an actual voltage value of an output-terminal;

a second acquisition module configured for, acquiring a second preset value corresponding to the input-terminal power according to a maximum discharging power of a high-voltage battery and an actual discharging power of an electric motor; and a determining module configured for determining a minimum value of the first preset value and the second preset value to be an input-terminal target-power limit value.

Optionally, the first acquisition module includes:

a first acquisition submodule configured for acquiring the current limit value and the actual voltage value of the output terminal;

a second acquisition submodule configured for acquiring a conversion efficiency of the DCDC converter; and a first determining submodule configured for, determining the first preset value corresponding to the input-terminal power according to the current limit value and the actual voltage value of the output terminal and the conversion efficiency of the DCDC converter.

Optionally, the first acquisition submodule includes:

an acquisition unit configured for acquiring a current protection value of a low-voltage loop and a storage-battery current limit value; and a first determining unit configured for, determining the current limit value of the output terminal according to the current protection value and the storage-battery current limit value.

Optionally, the second acquisition module includes:

a second determining submodule configured for, when an electric motor is in a driving state, determining the maximum discharging power of a high-voltage battery to be the second preset value corresponding to the input-terminal power.

Optionally, the second acquisition module includes:

a third determining submodule configured for, when an electric motor is in a generation state, determining a sum of an absolute value of the maximum discharging power of a high-voltage battery and an absolute value of the actual discharging power of an electric motor to be the second preset value corresponding to the input-terminal power.

Optionally, the second acquisition module includes:

a fourth determining submodule configured for, when the electric motor is in a generation state and a high-voltage battery is in a charging state, determining an absolute value of the actual discharging power of an electric motor to be the second preset value corresponding to the input-terminal power.

As compared with the prior art, the embodiments of the present disclosure have the following advantages:

The method for controlling a DCDC converter according to the embodiments of the present disclosure includes, acquiring a first preset value corresponding to an input-terminal power according to an current limit value and an actual voltage value of an output-terminal; acquiring a second preset value corresponding to the input-terminal power according to a maximum discharging power of a high-voltage battery and an actual discharging power of an electric motor; and determining a minimum value of the first preset value and the second preset value to be an input-terminal target-power limit value. The method takes into consideration multiple combined working conditions in which the power source of the input terminal is sufficient or insufficient, which improves the safety of the low-voltage system and the stability of the vehicle controller of the hybrid-power vehicle, ensures the usage efficiency of the DCDC converter to the utmost extent, and improves the use diversity and the accuracy of the DCDC converter.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work.

The drawings, which form part of the present disclosure, are intended to provide a further understanding of the present disclosure. The illustrative embodiments of the present disclosure and their explanation are intended to interpret the present disclosure, and do not inappropriately limit the present disclosure. In the drawings.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be noted that, subject to the avoiding of any conflict, the embodiments and the features of the embodiments of the present disclosure may be combined.

The present disclosure will be described in detail below with reference to the drawings and the embodiments.

Figure 1:
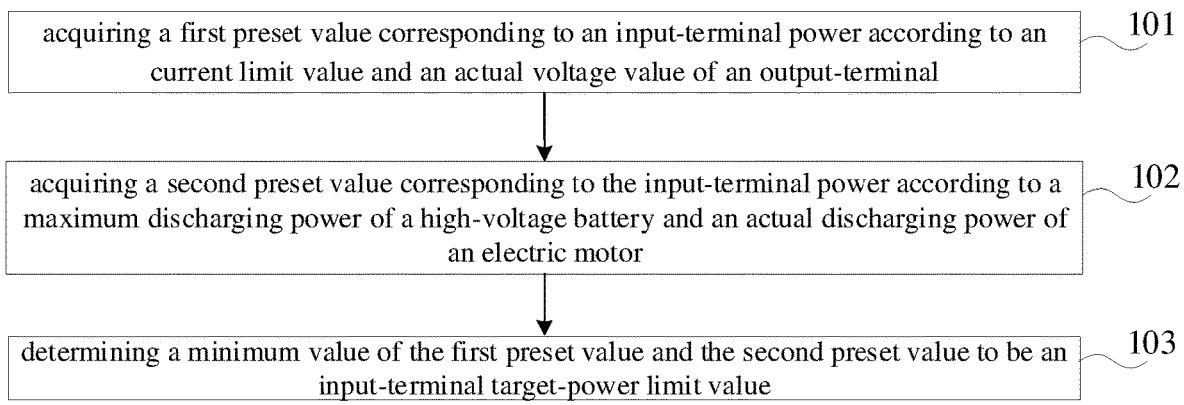
FIG. 1 shows a flow chart of the steps of the method for controlling a DCDC converter according to the first embodiment of the present disclosure.

Referring to FIG. 1, FIG. 1 shows a flow chart of the steps of the method for controlling a DCDC converter according to the first embodiment of the present disclosure. The method for controlling a DCDC converter may be applied to a hybrid-power vehicle.

As shown in FIG. 1, the method for controlling a DCDC converter may particularly include the following steps:

Step 101: acquiring a first preset value corresponding to an input-terminal power according to a current limit value and an actual voltage value of an output-terminal.

The DCDC converter is an important component for maintaining the normal operation of the low-voltage loop for a hybrid-power vehicle, and its function is to convert the high voltage inputted by the power source such as a high-voltage battery and a generator into a low voltage required by a low-voltage load such as a storage battery. In order to ensure the conversion efficiency of the DCDC converter, the voltage at the output terminal should be non-constant, which means that it is required that the power of the input terminal should be dynamically followed. A single input power constraint cannot satisfy the electricity-consumption requirements in various working conditions. A too low power constraint affects the normal usage of the low-voltage components and the stability of the vehicle controller. If the power constraint is too high, the DCDC converter does not reach the maximum usage efficiency, which results in the waste of the energy of the hybrid-power vehicle.

The first preset value corresponding to the input-terminal power refers to the first preset value of the constraint of the input-terminal power of the DCDC converter.

In an embodiment of the present disclosure, the particular implementation process of the step 101 may include:

Sub-step S1: acquiring the current limit value and the actual voltage value of the output terminal; and acquiring a conversion efficiency of the DCDC converter.

Acquiring the current limit value of the output terminal may include: firstly, acquiring a current protection value of a low-voltage loop and a storage-battery current limit value; and, subsequently determining the current limit value of the output terminal according to the current protection value and the storage-battery current limit value.

By fully considering the influence of current on the storage battery life on the precondition that the protection current of the low-voltage loop is not exceeded, the calculation is performed according to the current protection value of the low-voltage loop and the storage-battery current limit value. The storage-battery current limit value is calibrated based on the temperature and the quantity of electric charge, and its particular value is not limited in the embodiments of the present disclosure, and may be adjusted according to particular practical applications.

Sub-step S2: determining the first preset value corresponding to the input-terminal power according to the current limit value and the actual voltage value of the output terminal and the conversion efficiency of the DCDC converter.

The current limit value of the output terminal refers to the current limit value at the output terminal of the DCDC converter. According to the current limit value and the actual voltage value of the output terminal and the conversion efficiency of the DCDC converter, the first preset value corresponding to the input-terminal power is determined.

After acquiring the first preset value corresponding to the input-terminal power according to the current limit value and the actual voltage value of the output-terminal, the step 102 is executed.

Step 102: acquiring a second preset value corresponding to the input-terminal power according to a maximum discharging power of a high-voltage battery and an actual discharging power of an electric motor.

The second preset value corresponding to the input-terminal power refers to the second preset value of the constraint of the input-terminal power of the DCDC converter. The maximum discharging power refers to the maximum continuous-discharging power of the battery, and particularly refers to the maximum discharging capacity of the battery within 10 seconds that is sent by the battery managing system according to the real-time parameters (for example, the quantity of electric charge and the temperature). The actual discharging power of an electric motor refers to the actual electric power that is obtained by the electric-machine controlling unit by calculation according to the discharging current and voltage detected by itself in the generation state.

This step may include, firstly, acquiring a maximum discharging power of a high-voltage battery and an actual discharging power of an electric motor; and, subsequently, determining the second preset value corresponding to the input-terminal power according to the maximum discharging power of a high-voltage battery and the actual discharging power of an electric motor.

Particularly, the actual states of the high-voltage battery and the electric motor may serve as the determining conditions for selecting different calculating methods. The electric motor can be divided into a driving state and a generating state. The high-voltage battery can be divided into a discharging state and a charging state.

When the electric motor is in the driving state, the maximum discharging power of a high-voltage battery is determined to be the second preset value corresponding to the input-terminal power.

It should be noted that, when the electric motor is in the driving state, the high-voltage battery is in and can merely be in the discharging state, at which point the function of the electric motor is to convert the electric energy supplied by the high-voltage battery into the mechanical energy for the driving of the entire vehicle, and the high-voltage battery is the unique power-supply device in the high-voltage power system. Therefore, the maximum discharging power of a high-voltage battery is used as the second preset value corresponding to the input-terminal power.

When the electric motor is in the generation state, the sum of the absolute value of the maximum discharging power of a high-voltage battery and the absolute value of the actual discharging power of an electric motor is determined to be the second preset value corresponding to the input-terminal power.

It should be noted that, when the electric motor is in the generation state, the electric motor converts its own mechanical energy into electric energy, and the electric energy that it generates is preferentially supplied to the high-voltage loads such as the DCDC converter. If the supply of the electric motor is insufficient, the high-voltage battery supplements (the electric motor is in the discharging state), at which point the electric motor and the high-voltage battery jointly serve as the power-supply device in the high-voltage power system. If the supply of the electric motor is sufficient, the remaining electric energy is stored in the high-voltage battery (the battery is in the charging state), at which point the electric motor is the unique power-supply device in the high-voltage power system. In other words, when the electric motor is in the generation state and the high-voltage battery is in the discharging state, the sum of the absolute value of the maximum discharging power of a high-voltage battery and the absolute value of the actual discharging power of an electric motor is determined to be the second preset value corresponding to the input-terminal power.

When the electric motor is in the generation state and the high-voltage battery is in the charging state, the absolute value of the actual discharging power of an electric motor is determined to be the second preset value corresponding to the input-terminal power.

It should be noted that, when the electric motor is in the discharging state and the high-voltage battery is in the charging state, the electric motor converts its own mechanical energy into electric energy, part of the electric energy that the electric motor generates is supplied to the high-voltage loads such as the DCDC converter, and the excessive part is stored in the high-voltage battery (the battery is in the charging state), at which point the electric motor and the high-voltage battery jointly serve as the power-supply device in the high-voltage power system, and the absolute value of the actual discharging power of an electric motor is determined to be the second preset value corresponding to the input-terminal power.

After acquiring the second preset value corresponding to the input-terminal power according to the maximum discharging power of a high-voltage battery and the actual discharging power of an electric motor, the step 103 is executed.

Step 103: determining a minimum value of the first preset value and the second preset value to be an input-terminal target-power limit value.

The minimum value of the first preset value and the second preset value is selected as the maximum power limit value of the DCDC converter, i.e., as the input-terminal target-power limit value.

The method for controlling a DCDC converter according to the embodiments of the present disclosure includes, acquiring a first preset value corresponding to an input-terminal power according to an current limit value and an actual voltage value of an output-terminal; acquiring a second preset value corresponding to the input-terminal power according to a maximum discharging power of a high-voltage battery and an actual discharging power of an electric motor; and determining a minimum value of the first preset value and the second preset value to be an input-terminal target-power limit value. The method takes into consideration multiple combined working conditions in which the power source of the input terminal is sufficient or insufficient, which improves the safety of the low-voltage system and the stability of the vehicle controller of the hybrid-power vehicle, ensures the usage efficiency of the DCDC converter to the utmost extent, and improves the use diversity and the accuracy of the DCDC converter.

Figure 2:
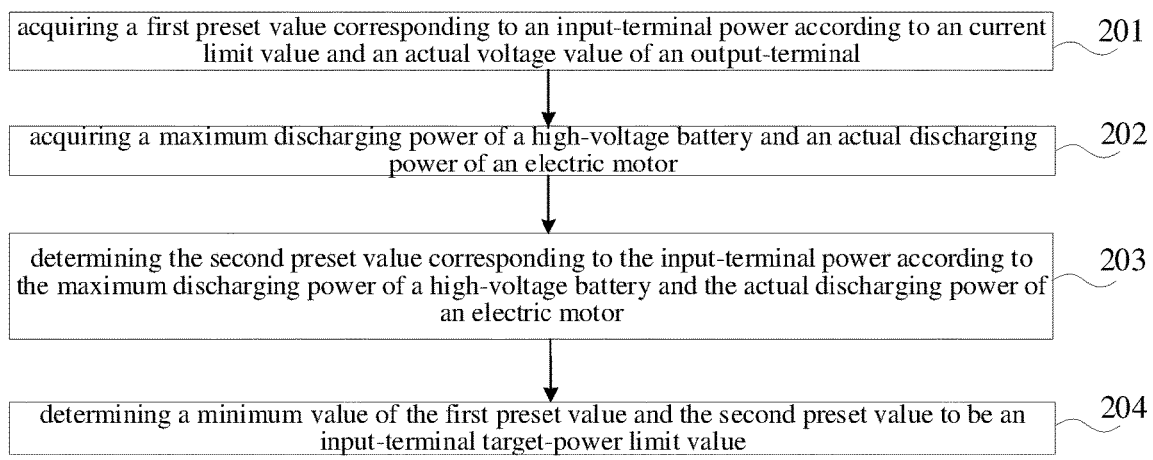
FIG. 2 shows a flow chart of the steps of the method for controlling a DCDC converter according to the second embodiment of the present disclosure.

Referring to FIG. 2, FIG. 2 shows a flow chart of the steps of the method for controlling a DCDC converter according to the second embodiment of the present disclosure. The method for controlling a DCDC converter is applied to a hybrid-power vehicle.

As shown in FIG. 2, the method for controlling a DCDC converter may particularly include the following steps:

Step 201: acquiring a first preset value corresponding to an input-terminal power according to an current limit value and an actual voltage value of an output-terminal.

Figure 3:
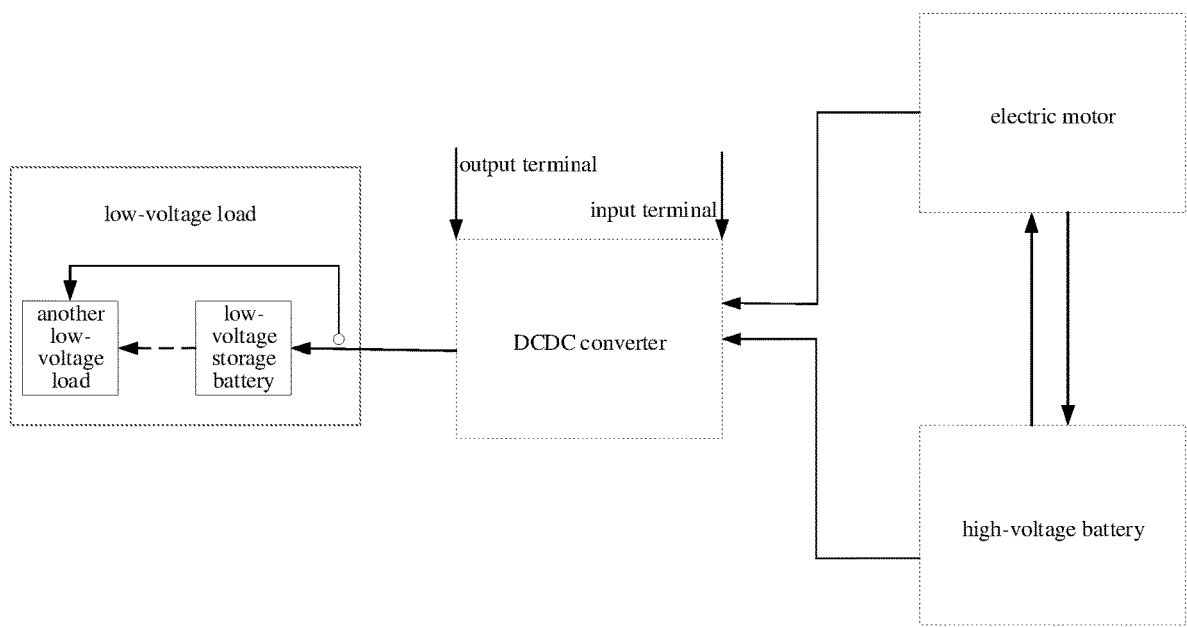
FIG. 3 shows a schematic structural diagram of a DCDC converting system according to an embodiment of the present disclosure.

The first preset value corresponding to the input-terminal power refers to the first preset value of the constraint of the input-terminal power of the DCDC converter. FIG. 3 shows a schematic structural diagram of a DCDC converting system according to an embodiment of the present disclosure. as shown in FIG. 3, the system includes a low-voltage load, a DCDC converter, an electric motor and a high-voltage battery. The low-voltage load may include a low-voltage storage battery and another low-voltage load. The DCDC converter may include an input terminal and an output terminal.

In an embodiment of the present disclosure, the particular implementation process of the step 101 may include:

Sub-step S1: acquiring the current limit value of the output terminal, and the conversion efficiency and the actual voltage value of the DCDC converter.

Acquiring the current limit value of the output terminal may include: firstly, acquiring a current protection value of a low-voltage loop and a storage-battery current limit value; and, subsequently, determining the current limit value of the output terminal according to the current protection value and the storage-battery current limit value.

Figure 4:
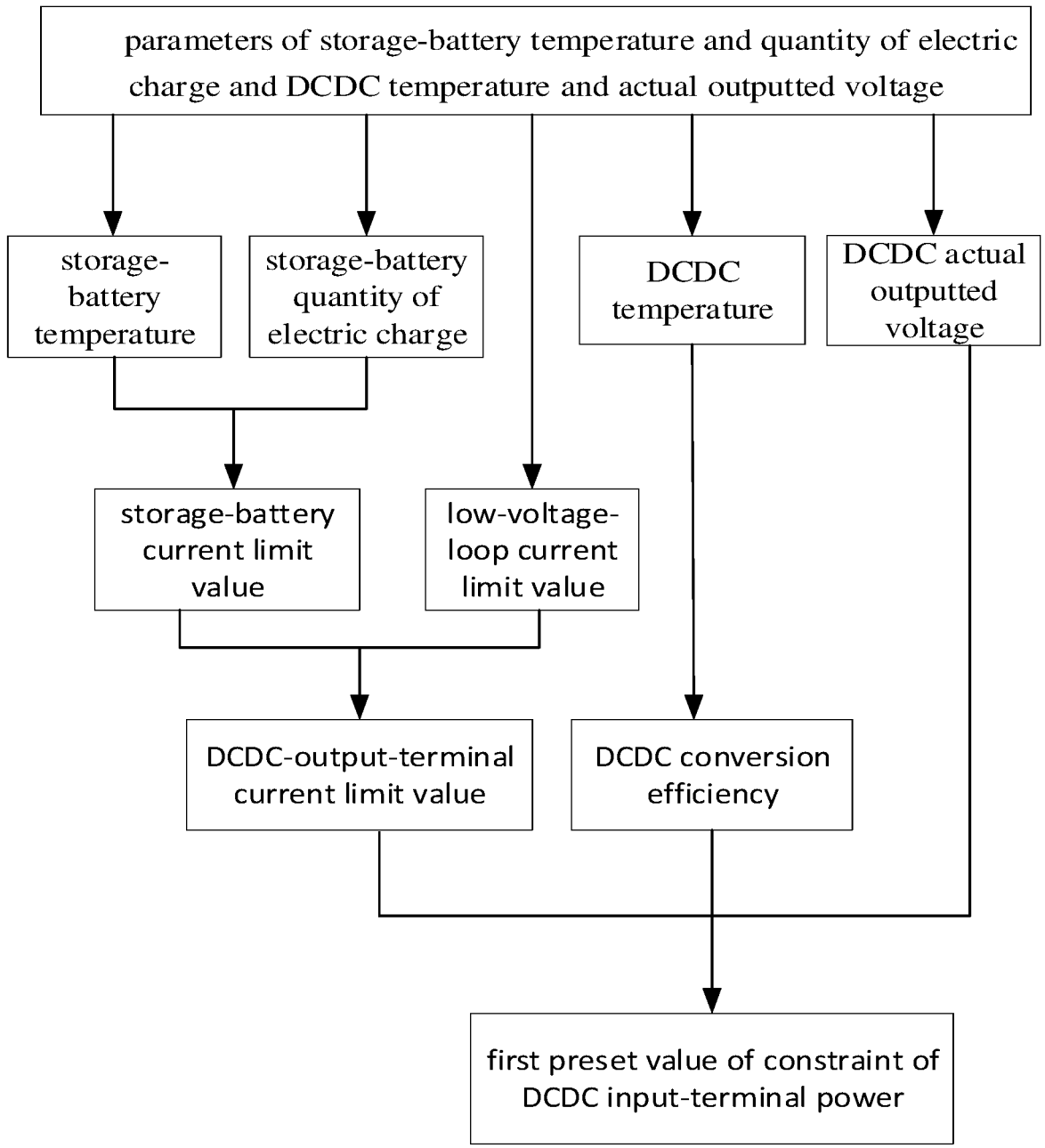
FIG. 4 shows a schematic diagram of the acquirement of the first preset value corresponding to the input-terminal power according to an embodiment of the present disclosure.

Referring to FIG. 4, FIG. 4 shows a schematic diagram of the acquirement of the first preset value corresponding to the input-terminal power according to an embodiment of the present disclosure. By fully considering the influence of current on the storage battery life on the precondition that the protection current of the low-voltage loop is not exceeded, the calculation is performed according to the current protection value of the low-voltage loop and the storage-battery current limit value. The storage-battery current limit value is calibrated based on the temperature and the quantity of electric charge, and its particular value is not limited in the embodiments of the present disclosure, and may be adjusted according to particular practical applications.

Sub-step S2: according to the current limit value and the actual voltage value of the output terminal and the conversion efficiency of the DCDC converter, determining the first preset value corresponding to the input-terminal power.

The current limit value of the output terminal refers to the current limit value at the output terminal of the DCDC converter. According to the current limit value and the actual voltage value of the output terminal and the conversion efficiency of the DCDC converter, the first preset value corresponding to the input-terminal power is determined.

After acquiring the first preset value corresponding to the input-terminal power according to the current limit value and the actual voltage value of the output-terminal, the step 202 is executed.

Step 202: acquiring a maximum discharging power of a high-voltage battery and an actual discharging power of an electric motor.

The second preset value corresponding to the input-terminal power refers to the second preset value of the constraint of the input-terminal power of the DCDC converter. The maximum discharging power refers to the maximum continuous-discharging power of the battery, and particularly refers to the maximum discharging capacity of the battery within 10 seconds that is sent by the battery managing system according to the real-time parameters (for example, the quantity of electric charge and the temperature). The actual discharging power of an electric motor refers to the actual electric power that is obtained by the electric-machine controlling unit by calculation according to the discharging current and voltage detected by itself in the generation state.

This step may include, firstly, acquiring a maximum discharging power of a high-voltage battery and an actual discharging power of an electric motor, and, subsequently, executing the step 203.

Step 203: determining the second preset value corresponding to the input-terminal power according to the maximum discharging power of a high-voltage battery and the actual discharging power of an electric motor.

Figure 5:
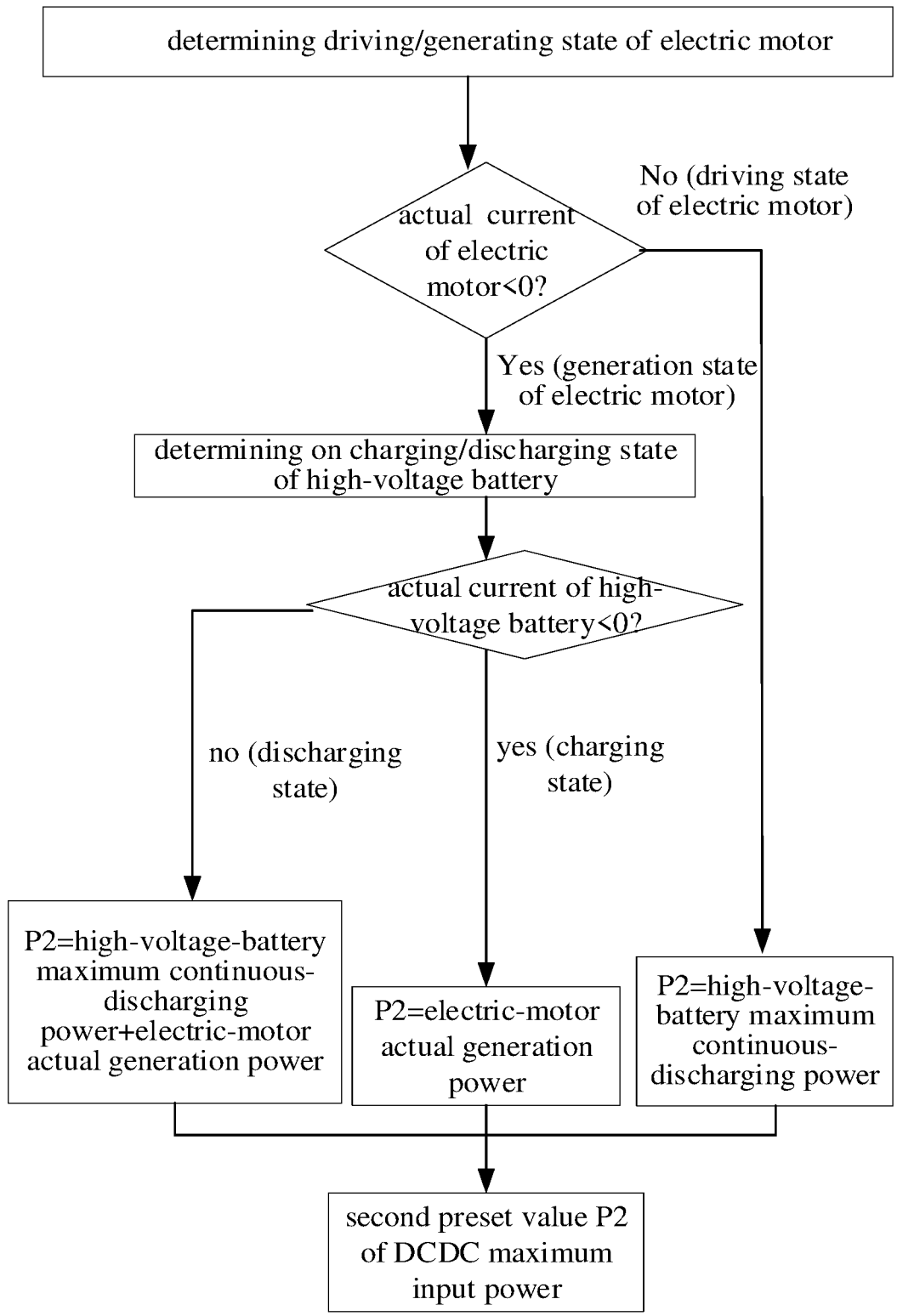
FIG. 5 shows a schematic diagram of the acquirement of the second preset value corresponding to the input-terminal power according to an embodiment of the present disclosure.

Particularly, the actual states of the high-voltage battery and the electric motor may serve as the determining conditions for selecting different calculating methods. The electric motor can be divided into a driving state and a generation state. The high-voltage battery can be divided into a discharging state and a charging state. Referring to FIG. 5, FIG. 5 shows a schematic diagram of the acquirement of the second preset value corresponding to the input-terminal power according to an embodiment of the present disclosure. When the actual current of the electric motor is less than 0, the electric motor is in the generation state. When the actual current of the electric motor is greater than or equal to 0, the electric motor is in the driving state. When the actual current of the high-voltage battery is less than zero, the high-voltage battery is in the charging state. When the actual current of the high-voltage battery is greater than or equal to 0, the high-voltage battery is in the discharging state.

When the electric motor is in the driving state, the maximum discharging power of a high-voltage battery is determined to be the second preset value corresponding to the input-terminal power ($P_2$).

It should be noted that, when the electric motor is in the driving state, the high-voltage battery is in and can merely be in the discharging state, at which point the function of the electric motor is to convert the electric energy supplied by the high-voltage battery into the mechanical energy for the driving of the entire vehicle, and the high-voltage battery is the unique power-supply device in the high-voltage power system. Therefore, the maximum discharging power of a high-voltage battery is used as the second preset value corresponding to the input-terminal power.

When the electric motor is in the generation state, the sum of the absolute value of the maximum discharging power of a high-voltage battery and the absolute value of the actual discharging power of an electric motor is determined to be the second preset value corresponding to the input-terminal power.

It should be noted that, when the electric motor is in the generation state, the electric motor converts its own mechanical energy into electric energy, and the electric energy that it generates is preferentially supplied to the high-voltage loads such as the DCDC converter. If the supply of the electric motor is insufficient, the high-voltage battery supplements (the electric motor is in the discharging state), at which point the electric motor and the high-voltage battery jointly serve as the power-supply device in the high-voltage power system. If the supply of the electric motor is sufficient, the remaining electric energy is stored in the high-voltage battery (the battery is in the charging state), at which point the electric motor is the unique power-supply device in the high-voltage power system. In other words, when the electric motor is in the generation state and the high-voltage battery is in the discharging state, the sum of the absolute value of the maximum discharging power of a high-voltage battery and the absolute value of the actual discharging power of an electric motor is determined to be the second preset value corresponding to the input-terminal power.

When the electric motor is in the generation state and the high-voltage battery is in the charging state, the absolute value of the actual discharging power of an electric motor is determined to be the second preset value corresponding to the input-terminal power.

It should be noted that, when the electric motor is in the discharging state and the high-voltage battery is in the charging state, the electric motor converts its own mechanical energy into electric energy, part of the electric energy that the electric motor generates is supplied to the high-voltage loads such as the DCDC converter, and the excessive part is stored in the high-voltage battery (the battery is in the charging state), at which point the electric motor and the high-voltage battery jointly serve as the power-supply device in the high-voltage power system, and the absolute value of the actual discharging power of an electric motor is determined to be the second preset value corresponding to the input-terminal power.

After acquiring the second preset value corresponding to the input-terminal power according to the maximum discharging power of a high-voltage battery and the actual discharging power of an electric motor, the step 204 is executed.

Step 204: determining a minimum value of the first preset value and the second preset value to be an input-terminal target-power limit value.

The minimum value of the first preset value and the second preset value is selected as the maximum power limit value of the DCDC converter, i.e., as the input-terminal target-power limit value.

Figure 6:
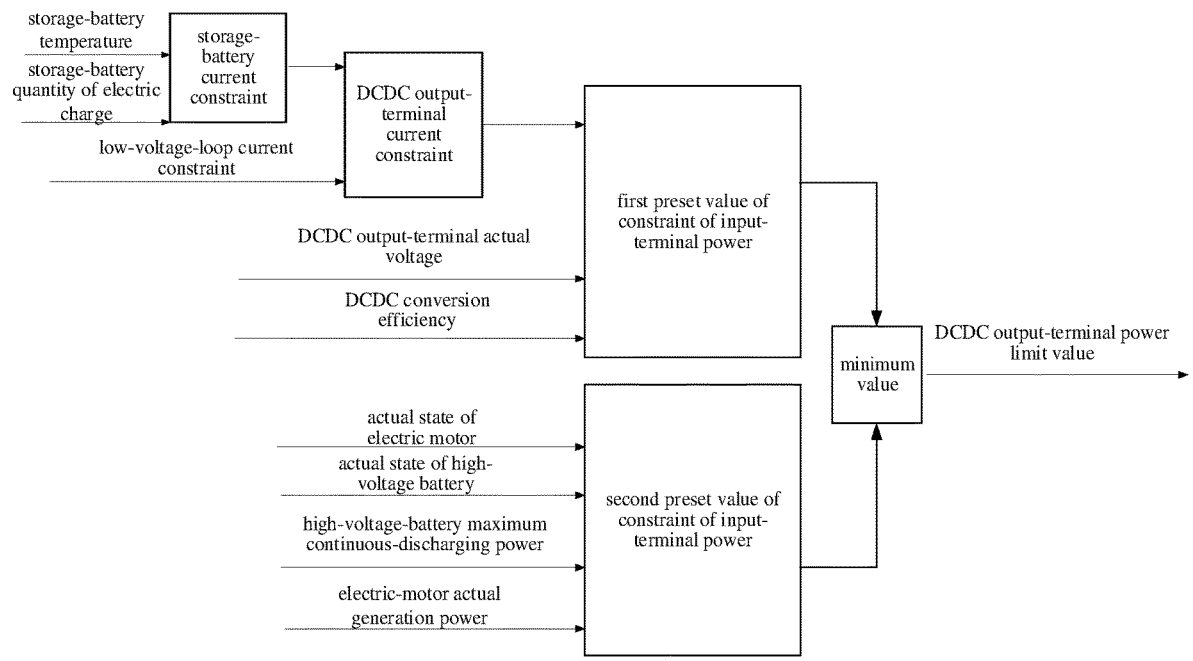
FIG. 6 shows a schematic diagram of the determination on the input-terminal target-power limit value according to the second embodiment of the present disclosure.

FIG. 6 shows a schematic diagram of the determination on the input-terminal target-power limit value according to an embodiment of the present disclosure. The process includes, according to an current limit value and an actual voltage value of an output-terminal, acquiring a first preset value corresponding to an input-terminal power; acquiring a maximum discharging power of a high-voltage battery and an actual discharging power of an electric motor; according to the maximum discharging power of a high-voltage battery and the actual discharging power of an electric motor, acquiring a second preset value corresponding to the input-terminal power; and determining a minimum value of the first preset value and the second preset value to be an input-terminal target-power limit value.

The method for controlling a DCDC converter according to the embodiments of the present disclosure includes, acquiring a first preset value corresponding to an input-terminal power according to an current limit value and an actual voltage value of an output-terminal; acquiring a maximum discharging power of a high-voltage battery and an actual discharging power of an electric motor; acquiring a second preset value corresponding to the input-terminal power according to the maximum discharging power of a high-voltage battery and the actual discharging power of an electric motor; and determining a minimum value of the first preset value and the second preset value to be an input-terminal target-power limit value. The method takes into consideration multiple combined working conditions in which the power source of the input terminal is sufficient or insufficient, which improves the safety of the low-voltage system and the stability of the vehicle controller of the hybrid-power vehicle, ensures the usage efficiency of the DCDC converter to the utmost extent, and improves the use diversity and the accuracy of the DCDC converter.

Figure 7:
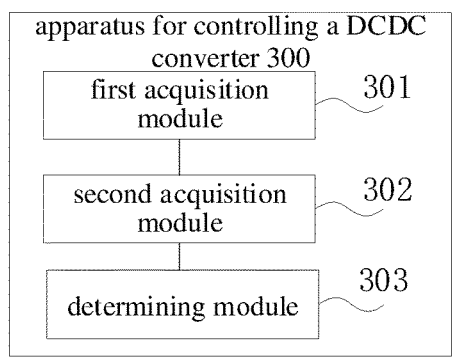
FIG. 7 shows a schematic structural diagram of the apparatus for controlling a DCDC converter according to the third embodiment of the present disclosure.

Referring to FIG. 7, FIG. 7 shows a schematic structural diagram of the apparatus for controlling a DCDC converter according to the third embodiment of the present disclosure. The apparatus for controlling a DCDC converter is applied to a hybrid-power vehicle.

As shown in FIG. 7, the apparatus for controlling a DCDC converter 300 may particularly include:

a first acquisition module 301 configured for, acquiring a first preset value corresponding to an input-terminal power according to an current limit value and an actual voltage value of an output-terminal;

a second acquisition module 302 configured for, acquiring a second preset value corresponding to the input-terminal power according to a maximum discharging power of a high-voltage battery and an actual discharging power of an electric motor; and a determining module 303 configured for determining a minimum value of the first preset value and the second preset value to be an input-terminal target-power limit value.

Optionally, the first acquisition module includes:

a first acquisition submodule configured for acquiring the current limit value and the actual voltage value of the output terminal;

a second acquisition submodule configured for acquiring a conversion efficiency of the DCDC converter; and a first determining submodule configured for, determining the first preset value corresponding to the input-terminal power according to the current limit value and the actual voltage value of the output terminal and the conversion efficiency of the DCDC converter.

Optionally, the first acquisition submodule includes:

an acquisition unit configured for acquiring a current protection value of a low-voltage loop and a storage-battery current limit value; and a first determining unit configured for, determining the current limit value of the output terminal according to the current protection value and the storage-battery current limit value.

Optionally, the second acquisition module includes:

a second determining submodule configured for, when an electric motor is in a driving state, determining the maximum discharging power of a high-voltage battery to be the second preset value corresponding to the input-terminal power.

Optionally, the second acquisition module includes:

a third determining submodule configured for, when an electric motor is in a generation state, determining a sum of an absolute value of the maximum discharging power of a high-voltage battery and an absolute value of the actual discharging power of an electric motor to be the second preset value corresponding to the input-terminal power.

Optionally, the second acquisition module includes:

a fourth determining submodule configured for, when the electric motor is in a generation state and a high-voltage battery is in a charging state, determining an absolute value of the actual discharging power of an electric motor to be the second preset value corresponding to the input-terminal power.

The particular implementations of the apparatus for controlling a DCDC converter according to the embodiments of the present disclosure have already been described in detail in the process section, and are not discussed herein further.

The apparatus for controlling a DCDC converter according to the embodiments of the present disclosure can, by using the first acquisition module, acquiring a first preset value corresponding to an input-terminal power according to an current limit value and an actual voltage value of an output-terminal; subsequently, by using the second acquisition module, acquiring a second preset value corresponding to the input-terminal power according to a maximum discharging power of a high-voltage battery and an actual discharging power of an electric motor; and finally, by using the determining module, determining a minimum value of the first preset value and the second preset value to be an input-terminal target-power limit value. The apparatus takes into consideration multiple combined working conditions in which the power source of the input terminal is sufficient or insufficient, which improves the safety of the low-voltage system and the stability of the vehicle controller of the hybrid-power vehicle, ensures the usage efficiency of the DCDC converter to the utmost extent, and improves the use diversity and the accuracy of the DCDC converter.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 8:
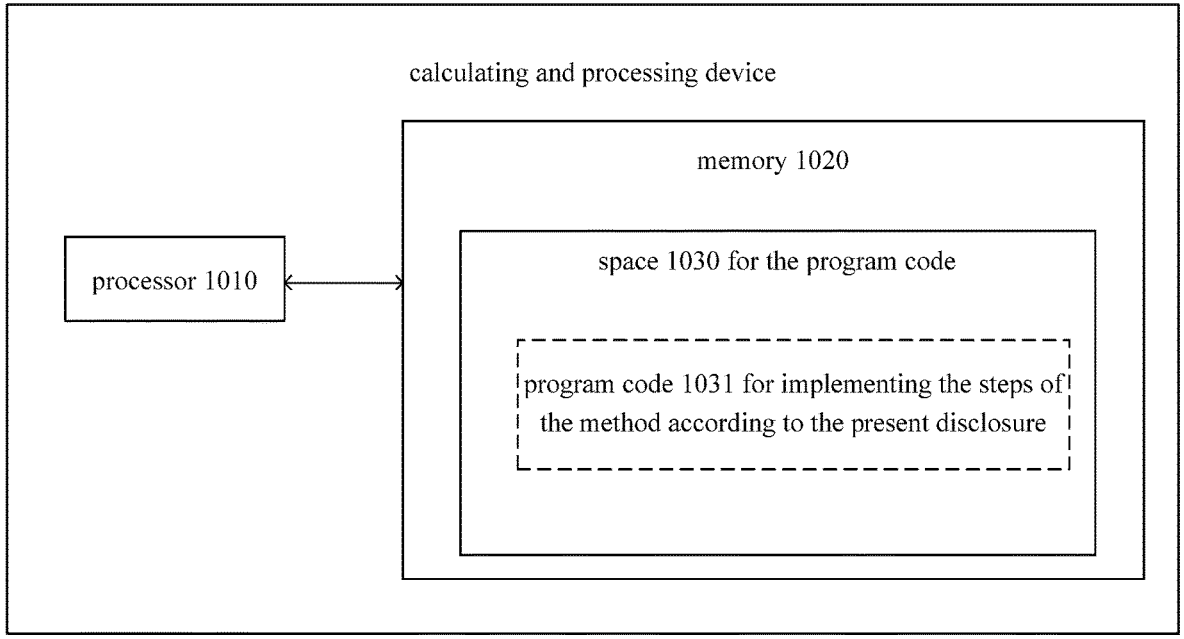
FIG. 8 schematically shows a block diagram of a calculating and processing device for implementing the method according to the present disclosure.
Figure 9:
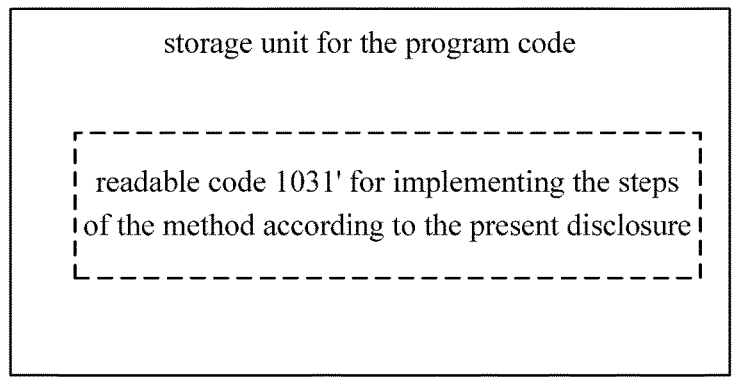
FIG. 9 schematically shows a storage unit for maintaining or carrying a program code for implementing the method according to the present disclosure.

For example, FIG. 8 shows a calculating and processing device that can implement the method according to the present disclosure. The calculating and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 9. The storage unit may have storage segments or storage spaces with similar arrangement to the memory 1020 of the calculating and processing device in FIG. 8. The program codes may, for example, be compressed in a suitable form. Generally, the storage unit contains a computer-readable code 1031', which can be read by a processor like 1010. When those codes are executed by the calculating and processing device, the codes cause the calculating and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A method for controlling a DCDC converter, wherein the method is applied to a hybrid-power vehicle, and the method comprises:
    by one or more processors, acquiring a first preset value corresponding to an input-terminal power according to a current limit value and an actual voltage value of an output terminal;
    by one or more processors, acquiring a second preset value corresponding to the input-terminal power according to a maximum discharging power of a high-voltage battery and an actual discharging power of an electric motor; and
    by one or more processors, determining a minimum value of the first preset value and the second preset value to be an input-terminal target-power limit value.

2. The method according to claim 1, wherein acquiring the first preset value corresponding to the input-terminal power according to the current limit value and the actual voltage value of the output-terminal comprises:
    acquiring the current limit value and the actual voltage value of the output terminal;
    acquiring a conversion efficiency of the DCDC converter; and
    determining the first preset value corresponding to the input-terminal power according to the current limit value and the actual voltage value of the output terminal and the conversion efficiency of the DCDC converter.

3. The method according to claim 2, wherein acquiring the current limit value of the output terminal comprises:
    acquiring a current protection value of a low-voltage loop and a storage-battery current limit value; and
    determining the current limit value of the output terminal according to the current protection value and the storage-battery current limit value.

4. The method according to claim 1, wherein acquiring the second preset value corresponding to the input-terminal power according to the maximum discharging power of the high-voltage battery and the actual discharging power of the electric motor:
    when the electric motor is in a driving state, determining the maximum discharging power of a high-voltage battery to be the second preset value corresponding to the input-terminal power.

5. The method according to claim 1, wherein determining the second preset value corresponding to the input-terminal power according to the maximum discharging power of the high-voltage battery and the actual discharging power of the electric motor, comprises:
    when the electric motor is in a generation state, determining a sum of an absolute value of the maximum discharging power of the high-voltage battery and an absolute value of the actual discharging power of the electric motor to be the second preset value corresponding to the input-terminal power.

6. The method according to claim 1, wherein determining the second preset value corresponding to the input-terminal power according to the maximum discharging power of the high-voltage battery and the actual discharging power of the electric motor comprises:
    when the electric motor is in a generation state and the high-voltage battery is in a charging state, determining an absolute value of the actual discharging power of the electric motor to be the second preset value corresponding to the input-terminal power.

7. An system for controlling a DCDC converter, wherein the system is applied to a hybrid-power vehicle, and the system comprises:
    one or more processors and a storage apparatus; and
    the storage apparatus stores a computer program which, when executed by the processor, perform the operations comprising:
    acquiring a first preset value corresponding to an input-terminal power according to a current limit value and an actual voltage value of an output-terminal;
    acquiring a second preset value corresponding to the input-terminal power according to a maximum discharging power of a high-voltage battery and an actual discharging power of an electric motor; and
    determining a minimum value of the first preset value and the second preset value to be an input-terminal target-power limit value.

8. The system according to claim 7, wherein the operations of the system comprise:

acquiring the current limit value and the actual voltage value of the output terminal;

acquiring a conversion efficiency of the DCDC converter; and determining the first preset value corresponding to the input-terminal power according to the current limit value and the actual voltage value of the output terminal and the conversion efficiency of the DCDC converter.

9. The system according to claim 8, wherein operations of the system comprise:

acquiring a current protection value of a low-voltage loop and a storage-battery current limit value; and determining the current limit value of the output terminal according to the current protection value and the storage-battery current limit value.

10. The system according to claim 7, wherein the operations of the system comprise:

when an electric motor is in a driving state, determining the maximum discharging power of the high-voltage battery to be the second preset value corresponding to the input-terminal power.

11. The system according to claim 7, wherein the operations of the system comprise:

when the electric motor is in a generation state, determining a sum of an absolute value of the maximum discharging power of the high-voltage battery and an absolute value of the actual discharging power of the electric motor to be the second preset value corresponding to the input-terminal power.

12. The system according to claim 7, wherein the operations of the system comprise:

when the electric motor is in a generation state and the high-voltage battery is in a charging state, determining an absolute value of the actual discharging power of an electric motor to be the second preset value corresponding to the input-terminal power.

13. A calculating and processing device, wherein the calculating and processing device comprises:

a memory storing a computer-readable code; and one or more processors, wherein when the computer-readable code is executed by the one or more processors, the calculating and processing device implements a method for controlling a DCDC converter, wherein the method is applied to a hybrid-power vehicle, and the method comprises:

by one or more processors, acquiring a first preset value corresponding to an input-terminal power according to a current limit value and an actual voltage value of an output terminal;

by one or more processors, acquiring a second preset value corresponding to the input-terminal power according to a maximum discharging power of a high-voltage battery and an actual discharging power of an electric motor; and by one or more processors, determining a minimum value of the first preset value and the second preset value to be an input-terminal target-power limit value.

14. A computer-readable medium, wherein the computer-readable medium stores a computer-readable code, and when the computer-readable code is executed, the method for controlling a DCDC converter according to claim 1 is performed.

15. The device according to claim 13, wherein acquiring the first preset value corresponding to the input-terminal power according to the current limit value and the actual voltage value of the output-terminal comprises:

acquiring the current limit value and the actual voltage value of the output terminal;

acquiring a conversion efficiency of the DCDC converter; and determining the first preset value corresponding to the input-terminal power according to the current limit value and the actual voltage value of the output terminal and the conversion efficiency of the DCDC converter.

16. The device according to claim 13, wherein acquiring the second preset value corresponding to the input-terminal power according to the maximum discharging power of the high-voltage battery and the actual discharging power of the electric motor:

when the electric motor is in a driving state, determining the maximum discharging power of a high-voltage battery to be the second preset value corresponding to the input-terminal power.

17. The device according to claim 13, wherein determining the second preset value corresponding to the input-terminal power according to the maximum discharging power of the high-voltage battery and the actual discharging power of the electric motor, comprises:

when the electric motor is in a generation state, determining a sum of an absolute value of the maximum discharging power of the high-voltage battery and an absolute value of the actual discharging power of the electric motor to be the second preset value corresponding to the input-terminal power.

18. The device according to claim 13, wherein determining the second preset value corresponding to the input-terminal power according to the maximum discharging power of the high-voltage battery and the actual discharging power of the electric motor comprises:

when the electric motor is in a generation state and the high-voltage battery is in a charging state, determining an absolute value of the actual discharging power of the electric motor to be the second preset value corresponding to the input-terminal power.

19. The device according to claim 13, wherein acquiring the current limit value of the output terminal comprises:

acquiring a current protection value of a low-voltage loop and a storage-battery current limit value; and determining the current limit value of the output terminal according to the current protection value and the storage-battery current limit value.

* * * * *